Patented Dec. 4, 1934

1,982,994

UNITED STATES PATENT OFFICE 1,982,994

METHOD OF MAKING ACIDOPHILUS MILK

John Harvey Kellogg, Battle Creek, Mich.

No Drawing. Application June 14, 1933,
Serial No. 675,713

2 Claims. (Cl. 99—11)

This invention relates to the producing of a new article of manufacture, that is, an acidophilus milk made wholly or partly from the milk of the soybean.

The value of Bacillus acidophilus milk, for the purpose of improving the character of the intestinal flora, is already well established. However, some difficulty has been experienced in making such acidophilus milk conveniently available to those who need it. The production of the acidophilus milk in the homes of the users is much to be desired, if it can be accomplished easily, with certainty of success and at low cost. But the ordinary cultures of Bacillus acidophilus do not grow readily in ordinary cow's milk, in fact their early propagation is attended with great difficulty, many transfers being required before the culture can be developed to a strength where it can be employed by unskilled persons for the production of acidophilus milk. It appears that when attempting to develop Bacillus acidophilus milk in the usual manner employing cow's milk alone together with the culture, unless the culture is particularly vigorous, other germs entering the milk from the atmosphere or from other sources often grow so fast that they outstrip and defeat the growth of the Bacillus acidophilus germs.

I have discovered that Bacillus acidophilus cultures may be developed very easily in the milk made from soybeans, whereas the development of a culture in cow's milk requires generally a number of transfers before it is able to make a sufficiently vigorous growth to produce a good quality of acidophilus milk, or "buttermilk" as it is often called. In the soybean milk the organisms grow immediately with great rapidity and require no transfers or training to render them efficient. If a portion of this product is employed to inoculate cow's milk, it is found that no further transfers are needed, and the production of a satisfactory acidophilus milk proceeds with greater rapidity than has heretofore been obtained in the producing of acidophilus milk.

I have further found that the culture count of soy acidophilus milk far exceeds the count in cow acidophilus milk. Old cultures are rejuvenated immediately. The organism is thicker and grouped in longer strings. Persons who are sensitized against cow's milk may employ soy acidophilus milk without experiencing allergic symptoms. In cases of acute colitis, especially in children, when cow's milk must be avoided, soy acidophilus milk is of special service. Likewise in cases of extreme toxemia, when all animal proteins are harmful to the patient, soy acidophilus milk may be used as a source of protein.

My invention may be employed by procuring the soybean milk which is already available in the market, made in any suitable manner, or for example that which is made in accordance with the U. S. Patent No. 1,444,812 issued February 13, 1923, to Gaston D. Thevenot. A pure culture of Bacillus acidophilus is then added.

In preparing soybean milk cultures of B. acidophilus, the soy milk must be thoroughly sterilized. About two per cent of lactose should be added to the soybean milk to encourage the growth of B. acidophilus and the production of lactic acid.

After inoculation of the soybean milk by a pure culture of B. acidophilus, a temperature closely approximating 100° F. should be steadily maintained until the desired degree of acidity is reached. The time usually required is from 10 to 15 hours, which is considerably less than the time required when cow's milk is used as the cultural medium. After the desired degree of acidity is reached, the milk should be placed and kept in a cool place so as to prevent further growth and the development of too high a degree of acidity.

Cultures of Bacillus acidophilus in soybean milk may thereafter be advantageously used for preparing cultures in which cow's milk or goat's milk is used as a further cultural medium, or a milk prepared from almonds, peanuts, cashew nuts or filberts may be used.

Soybean milk cultures of B. acidophilus may be advantageously used in producing ordinary acidophilus milk when cow's milk may be used without injury or inconvenience, by inoculating and incubating sterilized cow's milk in the usual way. Such cultures grow so much more vigorously than do ordinary milk cultures of B. acidophilus that excellent acidophilus may be prepared with either soy milk or cow's milk with such precautions as may be employed in an ordinary kitchen.

It should be understood that the above examples are merely illustrative of the invention and that considerable variation and modification thereof may be employed without departing from the spirit and the scope of this invention, particularly as it is defined in the appended claims.

Claims to the product made in accordance with this invention are made in my copending application, Serial No. 752,183, filed November 8, 1934, entitled "Acidophilus soybean milk".

I claim:

1. A method of producing a Bacillus acidophilus soybean milk which comprises thoroughly sterilizing a milk produced from soybeans inoculating the milk with strains of *Bacillus acidophilus*, maintaining the inoculated product at approximately 100° F. while the strains develop, and checking the development when it has progressed a desired extent by cooling the milk.

2. A method of producing a *Bacillus acidophilus* soybean milk comprising thoroughly sterilizing a milk made from soybeans, adding about 2% of lactose to said milk, inoculating the milk with *Bacillus acidophilus*, maintaining the culture at about 100° F. until the desired growth of the culture has been attained, and thereafter checking said growth by cooling the milk.

JOHN HARVEY KELLOGG.